United States Patent
Lou et al.

(10) Patent No.: US 11,570,791 B2
(45) Date of Patent: Jan. 31, 2023

(54) RESOURCE ALLOCATION METHOD AND APPARATUS

(71) Applicant: HUAWEI TECHNOLOGIES CO., LTD., Shenzhen (CN)

(72) Inventors: Chong Lou, Shanghai (CN); Xingxing Hu, Shanghai (CN); Xing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 17/094,818

(22) Filed: Nov. 11, 2020

(65) Prior Publication Data
US 2021/0068126 A1 Mar. 4, 2021

Related U.S. Application Data

(63) Continuation of application No. PCT/CN2019/085857, filed on May 7, 2019.

(30) Foreign Application Priority Data

May 11, 2018 (CN) .......................... 201810450623.7

(51) Int. Cl.
*H04W 72/12* (2009.01)
*H04L 47/215* (2022.01)
(Continued)

(52) U.S. Cl.
CPC ....... *H04W 72/1242* (2013.01); *H04L 47/215* (2013.01); *H04W 28/0268* (2013.01); *H04W 80/02* (2013.01)

(58) Field of Classification Search
None
See application file for complete search history.

(56) References Cited

U.S. PATENT DOCUMENTS 8,638,815 B2 1/2014 Earnshaw et al.
8,879,534 B2 * 11/2014 Marinier ................. H04L 47/36
370/345

(Continued)

FOREIGN PATENT DOCUMENTS

CN 102123512 A 7/2011
CN 102149206 A 8/2011
(Continued)

OTHER PUBLICATIONS

Indian Office Action issued in Indian Application No. 202047046345 dated Dec. 3, 2021 with English translation (8 pages).
(Continued)

*Primary Examiner* — Eunsook Choi

(57) ABSTRACT

Various embodiments provide a resource allocation method and an apparatus. In those embodiments, a terminal device obtains a first parameter indicating a maximum service data volume to be provided by an access network device for a first service in a first time length; and determines, based on the maximum service data volume, a resource of a media access control protocol data unit MAC PDU, the resource being occupied by buffered data of the first service. In those embodiments, the terminal device determines, based on the maximum service data volume of the first service, the resource of the MAC PDU. Compared with a conventional method, the maximum service data volume of the first service is considered. This helps improve reasonableness of allocating the resource of the MAC PDU to the data of the first service.

19 Claims, 4 Drawing Sheets

(51) Int. Cl.
*H04W 28/02* (2009.01)
*H04L 12/819* (2013.01)
*H04W 80/02* (2009.01)

(56) References Cited

U.S. PATENT DOCUMENTS

| | | | |
|---|---|---|---|
| 9,913,286 B2 | 3/2018 | Sammour et al. | |
| 2008/0069046 A1* | 3/2008 | Ishii | H04W 72/1257 455/452.2 |
| 2008/0273520 A1* | 11/2008 | Kim | H04W 28/24 370/310 |
| 2009/0003290 A1* | 1/2009 | Lee | H04L 1/0006 370/336 |
| 2010/0214916 A1* | 8/2010 | Wu | H04L 47/805 370/230 |
| 2016/0036637 A1* | 2/2016 | Malik | H04L 41/0816 370/329 |
| 2017/0013499 A1* | 1/2017 | Chen | H04W 28/0278 |
| 2017/0374579 A1 | 12/2017 | Wang et al. | |
| 2019/0253917 A1* | 8/2019 | Dao | H04W 28/0268 |
| 2020/0336912 A1 | 10/2020 | Yang et al. | |
| 2021/0037425 A1 | 2/2021 | Kainulainen et al. | |
| 2021/0068126 A1 | 3/2021 | Lou et al. | |

FOREIGN PATENT DOCUMENTS

| | | |
|---|---|---|
| CN | 102348292 A | 2/2012 |
| CN | 104144484 A | 11/2014 |
| CN | 106102084 A | 11/2016 |
| CN | 109845320 A | 6/2019 |
| WO | 2017196099 A1 | 11/2017 |
| WO | WO-2018196867 A1 * | 11/2018 ........... H04L 47/283 |

OTHER PUBLICATIONS

TSG SA WG2: "[Draft] LS on URLLC Services", 3GPP Draft; S2-183260—Apr. 10, 2018 (Apr. 10, 2018), XP051437621, total 2 pages.
Samsung: "MAC Impact of Separate MCS/CQI Table for URLLC", 3GPP Draft; R2-1806148, Apr. 6, 2018, XP05141 6462, total 5 pages.
Mediatek Inc et al: "LCP for grant-free transmissions", 3GPP Draft; R2-1711423, Oct. 8, 2017, XP051343408, total 5 pages.
Extended European Search Report issued in European Application No. 19799701.8 dated Apr. 23, 2021 (13 pages).
International Search Report (PCT/ISA/210) & Written Opinion (PCT/ISA/237) issued in PCT Application No. PCT/CN2019/085857 dated Jul. 15, 2019 with English translation (18 pages).
International Preliminary Report on Patentability (PCT/IB/373) with Written Opinion (PCT/ISA/237) issued in PCT Application No. PCT/CN2019/085857 dated Nov. 17, 2020 with English translation (13 pages).
Ericsson, Maximum Data Burst Volume (MDBV). 3GPP TSG-RAN WG2 #102, Busan, Republic of Korea, May 21-25, 2018, R2-1807197, 4 pages.
Nokia et al.,"MDBV in Uplink",3GPP TSG-RAN WG2 Meeting #101 bis R2-1804911,Sanya, China, Apr. 16-20, 2018,Total 3 Pages.
Huawei,"Uplink MDBV control",3GPP TS G-RAN WG2 Meeting #102 R2-1807451,Busan, Korea, May 21-25, 2018, Total 2 Pages.
Nokia et al: "On delivering Delay critical service consistently end to end", 3GPP Draft; S2-183400, Apr. 9, 2018, XP051437453, total 7 pages.
3GPP TS 23.501 V15.1.0 (Mar. 2018), 3rd Generation Partnership Project;Technical Specification Group Services and System Aspects; System Architecture for the 5G System; Stage 2(Release 15), total 201 pages.
Chinese Office Action issued in Chinese Application No. 201810445337.1 dated Oct. 26, 2020 (9 pages).
Extended European Search Report issued in European Application No. 19800822.9 dated Jun. 7, 2021 (8 pages).
U.S. Office Action issued in U.S. Appl. No. 17/094,287 dated Mar. 16, 2022 (32 pages).
U.S. Final Office Action issued in U.S. Appl. No. 17/094,287 dated Jul. 18, 2022 (26 pages).

* cited by examiner

RESOURCE ALLOCATION METHOD AND APPARATUS

CROSS-REFERENCE TO RELATED APPLICATIONS

This application is a continuation of International Application No. PCT/CN2019/085857, filed on May 7, 2019, which claims priority to Chinese Patent Application No. 201810450623.7, filed on May 11, 2018. The disclosures of the aforementioned applications are hereby incorporated by reference in their entireties.

TECHNICAL FIELD

This application relates to the communications field, and more specifically, to a resource allocation method and an apparatus.

BACKGROUND

With the development of technologies, a communications system needs to be applied to more scenarios to provide communications services for more services. Quality of service (QoS) of services in different scenarios is different. To more properly describe the QoS of the different services, new QoS characteristics may be introduced. For example, a 5th generation (5G) mobile communications system needs to be applied to scenarios such as remote industrial control and intelligent transportation. In such scenarios, service data usually requires a relatively short transmission delay and a relatively low transmission error rate. For the transmission characteristic of a service in such scenarios, such a service may be classified as a guaranteed bit rate (GBR) service, and the new QoS characteristics are introduced for such a service.

However, in an existing logical channel prioritization (LCP) process, a terminal device still allocates, based only on a prioritised bit rate (PRB) and a priority of logical channels, resources of a media access control (MAC) protocol data unit (PDU) to service data buffered in the logical channels.

Therefore, according to a new resource allocation method, the resources of the MAC PDU are more properly allocated, in the LCP process, to the service data buffered in the logical channels.

SUMMARY

Various embodiments provide a resource allocation method and an apparatus. This helps improve reasonableness of allocating a resource of a MAC PDU to data of a first service.

According to a first aspect, a resource allocation method is provided, where the method includes:

obtaining, by a terminal device, a first parameter, where the first parameter is used to indicate a maximum service data volume provided by an access network device for a first service in a first time length; and determining, by the terminal device based on the maximum service data volume, a resource that is of a media access control protocol data unit MAC PDU and that is occupied by buffered data of the first service.

In various embodiments, the terminal device determines, based on the maximum service data volume, the resource that is of the MAC PDU and that is occupied by the buffered data of the first service. Compared with a conventional method for allocating the resource of the MAC PDU, the maximum service data volume of the first service is considered. This helps improve reasonableness of allocating the resource of the MAC PDU to the data of the first service.

In one example implementation, the method further includes:

obtaining, by the terminal device, a second parameter, where the second parameter is used to indicate the first time length; and determining, by the terminal device, a total volume of the data that is of the first service and that is transmitted in the first time length; and the determining, by the terminal device based on the maximum service data volume, a resource that is of a MAC PDU and that is occupied by buffered data of the first service includes:

determining, by the terminal device based on the maximum service data volume, and the total volume of the data of the first service, the resource that is of the MAC PDU and that is occupied by the data of the first service.

In various embodiments, the resource that is of the MAC PDU and that is occupied by the data of the first service is determined based on the maximum service data volume of the data of the first service and the total volume of the data of the first service. This helps improve the reasonableness of allocating the resource of the MAC PDU to the data of the first service.

In one example implementation, the determining, by the terminal device based on the maximum service data volume, and the total volume of the data of the first service, the resource that is of the MAC PDU and that is occupied by the buffered data of the first service includes:

if the total volume of the data of the first service is less than or equal to the maximum service data volume, determining, by the terminal device, that the data of the first service occupies the resource of the MAC PDU.

In various embodiments, when the total volume of the data of the first service is less than or equal to the maximum service data volume, it is determined that the data of the first service has a relatively high requirement on a delay, and that the resource of the MAC PDU is allocated to the first service in the MAC PDU to be sent this time. This helps improve the reasonableness of allocating the resource of the MAC PDU.

In one example implementation, the determining, by the terminal device based on the maximum service data volume, and the total volume of the data of the first service, the resource that is of the MAC PDU and that is occupied by the buffered data of the first service includes:

if the total volume of the data of the first service is greater than the maximum service data volume, determining, by the terminal device, that the data of the first service does not occupy the resource of the MAC PDU.

In various embodiments, when the total volume of the data of the first service is greater than the maximum service data volume, it is determined that the data of the first service has a relatively low requirement on a delay, and that the resource of the MAC PDU is not allocated to the first service in the MAC PDU to be sent this time, so that other service data having the relatively high requirement on the delay can be sent in the MAC PDU. This helps improve the reasonableness of allocating the resource of the MAC PDU.

In one example implementation, the determining, by the terminal device based on the maximum service data volume, and the total volume of the data of the first service, the resource that is of the MAC PDU and that is occupied by the data of the first service includes:

if the total volume of the data of the first service is less than or equal to the maximum service data volume, determining, by the terminal device, that the data of the first service occupies a remaining resource of the MAC PDU, where the remaining resource is a remaining resource that is in the MAC PDU after resources of the MAC PDU are allocated based on a minimum data rate PBR and a priority of logical channels.

In various embodiments, when the total volume of the data of the first service is less than or equal to the maximum service data volume, it is determined that the data of the first service has the relatively high requirement on the delay, and that the resource of the MAC PDU is allocated to the first service in the remaining resource of the to-be-sent MAC PDU. This helps improve the reasonableness of allocating the resource of the MAC PDU.

In one example implementation, the determining, by the terminal device based on the maximum service data volume, and the total volume of the data of the first service, the resource that is of the MAC PDU and that is occupied by the buffered data of the first service further includes:

if the total volume of the data of the first service is greater than the maximum service data volume, determining, by the terminal device, that the data of the first service does not occupy the remaining resource.

In various embodiments, when the total volume of the data of the first service is greater than the maximum service data volume, it is determined that the data of the first service has a relatively low requirement on a delay, and that the remaining resource of the MAC PDU is not allocated to the first service in the MAC PDU to be sent this time, so that a possibility that other service data having a relatively high requirement on a delay can be sent in the MAC PDU is improved. This helps improve the reasonableness of allocating the resource of the MAC PDU.

In one example implementation, the determining, by the terminal device based on the maximum service data volume, and the total volume of the data of the first service, the resource that is of the MAC PDU and that is occupied by the buffered data of the first service includes:

determining, by the terminal device based on the maximum service data volume, and the total volume of the data of the first service, a priority of a logical channel on which the data of the first service is buffered; and determining, by the terminal device based on the priority of the logical channel, the resource that is of the MAC PDU and that is occupied by the data of the first service.

In various embodiments, the terminal device adjusts the priority of the logical channel based on the data volume of maximum service data and the total volume of the data of the first service, and allocates the resource in the MAC PDU based on an adjusted priority of the logical channel.

In one example implementation, the determining, by the terminal device based on the maximum service data volume, and the total volume of the data of the first service, a priority of the logical channel includes:

if the total volume of the data of the first service is greater than the maximum service data volume, adjusting, by the terminal device, the priority of the logical channel from a first priority to a second priority, where the second priority is lower than the first priority.

In some embodiments, the terminal device may determine, based on the second priority, all resources of the MAC PDU that are occupied by the data of the first service, or the terminal device may determine, based on the second priority, a remaining resource that is of the MAC PDU and that is occupied by the data of the first service.

In various embodiments, when the total volume of the data of the first service is greater than the maximum service data volume, it is determined that the data of the first service has a relatively low requirement on a delay. In this case, degradation processing is performed on the priority of the logical channel on which the data of the first service is transmitted, and it is determined, based on a degraded priority, the resource that is of the MAC PDU and that is occupied by the data of the first service, so that a possibility that other service data having a relatively high requirement on a delay can be sent in the MAC PDU is improved. This helps improve the reasonableness of allocating the resource of the MAC PDU.

In one example implementation, the determining, by the terminal device based on the priority of the logical channel, the resource that is of the MAC PDU and that is occupied by the data of the first service includes:

determining, by the terminal device based on the second priority, the resource that is of the MAC PDU and that is occupied by the data of the first service.

In various embodiments, when the total volume of the data of the first service is greater than the maximum service data volume, it is determined that the data of the first service has the relatively low requirement on the delay. In this case, degradation processing is performed on the priority of the logical channel on which the data of the first service is transmitted, and it is determined, based on a degraded priority, the resource that is of the MAC PDU and that is occupied by the data of the first service, so that a possibility that other service data having the relatively high requirement on the delay can be sent in the MAC PDU is improved. This helps improve the reasonableness of allocating the resource of the MAC PDU.

In one example implementation, the determining, by the terminal device based on the maximum service data volume, a resource that is of the MAC PDU and that is occupied by data of the first service includes:

determining, by the terminal device based on a value M of the maximum service data volume and a quantity of tokens on a logical channel on which the data of the first service is buffered, the resource that is of the MAC PDU and that is occupied by the data of the first service, where the quantity of tokens on the logical channel increases by M×T after the first time length T.

In various embodiments, the terminal device maintains the quantity of tokens, and a growth rate of the quantity of tokens on the logical channel is M×T, so that the maximum service data volume is considered in a process in which the terminal device determines the resource that is of the MAC PDU and that is occupied by the data of the first service. This helps improve the reasonableness of allocating the resource of the MAC PDU.

In one example implementation, the obtaining, by a terminal device, a first parameter includes: receiving, by the terminal device, the first parameter sent by the network device.

In one example implementation, the obtaining, by the terminal device, a second parameter includes: receiving, by the terminal device, the second parameter sent by the network device.

According to a second aspect, a resource allocation method is provided, where the method includes:

obtaining, by a network device, a first parameter, where the first parameter is used to indicate a maximum service data volume provided by an access network device for data of a first service in a first time length; and sending, by the network device, the first parameter to the terminal device.

In various embodiments, the network device sends the maximum service data volume to the terminal device, so that the terminal device determines, based on the maximum service data volume, a resource that is of a MAC PDU and that is occupied by data of the first service. This helps improve reasonableness of allocating the resource of the MAC PDU by the terminal device.

In one example implementation, the method further includes:

sending, by the network device, a second parameter to the terminal device, where the second parameter is used to indicate the first time period.

In the various embodiments, the network device sends the first time length to the terminal device, so that the terminal device determines a total volume of the data that is of the first service and that is transmitted in the first time period, and determines, based on the maximum service data volume, and the total volume of the data of the first service, the resource that is of the MAC PDU and that is occupied by the data of the first service. This helps improve the reasonableness of allocating the resource of the MAC PDU by the terminal device.

According to a third aspect, a resource allocation method is provided, where the method includes:

selecting, by a terminal device, a target LCP parameter set from a plurality of LCP parameter sets; and determining, by the terminal device based on the target LCP parameter set, a resource that is of a MAC PDU and that is occupied by data of a first service.

In various embodiments, the terminal device selects the target LCP parameter set from the plurality of LCP parameter sets, and determines, based on the target LCP parameter set, the resource that is of the MAC PDU and that is occupied by the data of the first service. This helps improve flexibility of determining, by the terminal device, the resource that is of the MAC PDU and that is occupied by the data of the first service.

In one example implementation, the determining, by the terminal device based on the target LCP parameter set, a resource that is of a MAC PDU and that is occupied by data of a first service includes:

determining, by the terminal device in a first time period based on the target LCP parameter set, the resource that is of the MAC PDU and that is occupied by the data of the first service.

In one example implementation, the determining, by the terminal device based on the target LCP parameter, a resource that is of a MAC PDU and that is occupied by data of a first service includes: determining, by the terminal device in the first time period based on the target LCP parameter, the resource that is of the MAC PDU and that is occupied by the data of the first service. In one example implementation, the method further includes: obtaining, by the terminal device, time information, where the time information is used to indicate a time period in which each of the plurality of LCP parameter sets is used.

In one example implementation, each LCP parameter of the plurality of LCP parameter sets includes at least one of the following parameters: a priority of a logical channel on which the data of the first service is buffered, a PBR of the logical channel, and a BSD of a token bucket of the logical channel.

According to a fourth aspect, a resource allocation method is provided, where the method includes:

receiving, by a terminal device, resource allocation indication information sent by a network device, where the resource allocation indication information is used to indicate whether data of the first service participates in a process of allocating a remaining resource of a MAC PDU, where the remaining resource is a remaining resource that is in the MAC PDU after resources of the MAC PDU are allocated based on a minimum data rate PBR and a priority of logical channels; and allocating, by the terminal device, the remaining resource of the MAC PDU based on the resource allocation indication information.

In various embodiments, the network device sends the resource allocation indication information to the terminal device, to indicate whether the terminal device allocates a resource of the MAC PDU to the data of the first service in the remaining resource of the MAC PDU. This helps improve flexibility of allocating the resource of the MAC PDU by the terminal device.

According to a fifth aspect, a network device is provided, where the network device includes modules of the network device and configured to perform the foregoing method.

According to a sixth aspect, a terminal device is provided, where the terminal device includes modules of the terminal device and configured to perform the foregoing method.

According to a seventh aspect, a communications apparatus is provided, and the communications apparatus has functions of implementing the terminal device in the foregoing method designs. The functions may be implemented by hardware, or may be implemented by hardware executing corresponding software. The hardware or the software includes one or more units corresponding to the foregoing functions.

According to an eighth aspect, a communications apparatus is provided, and the communications apparatus has functions of implementing the network device in the foregoing method designs. The functions may be implemented by hardware, or may be implemented by hardware executing corresponding software. The hardware or the software includes one or more units corresponding to the foregoing functions.

According to a ninth aspect, a communications apparatus is provided, where the communications apparatus includes a processor and a memory. The memory is configured to store a program or an instruction, and the processor is configured to invoke and run the program or the instruction from the memory, so that the communications apparatus performs the steps performed by the terminal device in the methods in the foregoing aspects. In some embodiments, the communications apparatus may further include a transceiver, configured to support the communications apparatus in sending and receiving data, signaling, or information in the foregoing methods, for example, receiving a first parameter sent by a network device. In some embodiments, the communications apparatus may be a terminal device, or may be a part of an apparatus in a terminal device, for example, a chip system in the terminal device. In some embodiments, the chip system is configured to support the terminal device in implementing functions in the foregoing aspects, for example, generating, receiving, sending, or processing data and/or information in the foregoing methods. In one example design, the chip system further includes a memory, and the memory is configured to store a program instruction and data that are necessary for the terminal device. The chip system includes a chip, or may include another discrete device or circuit structure.

According to a tenth aspect, a communications apparatus is provided, where the communications apparatus includes a processor and a memory. The memory is configured to store a program or an instruction, and the processor is configured to invoke and run the program or the instruction from the memory, so that the communications apparatus performs the steps performed by the network device in the methods in the foregoing aspects. In some embodiments, the communications apparatus may further include a transceiver, configured to support the communications apparatus in sending and receiving data, signaling, or information in the foregoing methods, for example, sending a first parameter to a terminal device. In some embodiments, the communications apparatus may be a network device, or may be a part of an apparatus in a network device, for example, a chip system in the network device. In some embodiments, the chip system is configured to support the network device in implementing functions in the foregoing aspects, for example, generating, receiving, sending, or processing data and/or information in the foregoing methods. In one example design, the chip system further includes a memory, and the memory is configured to store a program instruction and data that are necessary for the terminal device. The chip system includes a chip, or may include another discrete device or circuit structure.

According to an eleventh aspect, a computer program product is provided, where the computer program product includes computer program code, and when the computer program code is run on a computer, the computer is enabled to perform the methods in the foregoing aspects.

It should be noted that some or all of the computer program code can be stored in a first storage medium. The first storage medium can be encapsulated with a processor, or encapsulated separately from a processor. This is not specifically limited in the various embodiments.

According to a twelfth aspect, a computer-readable medium is provided, where the computer-readable medium stores program code, and when the computer program code is run on a computer, the computer is enabled to perform the methods in the foregoing aspects.

DESCRIPTION OF EMBODIMENTS

The following describes the solutions in various embodiments with reference to the accompanying drawings.

Figure 1:
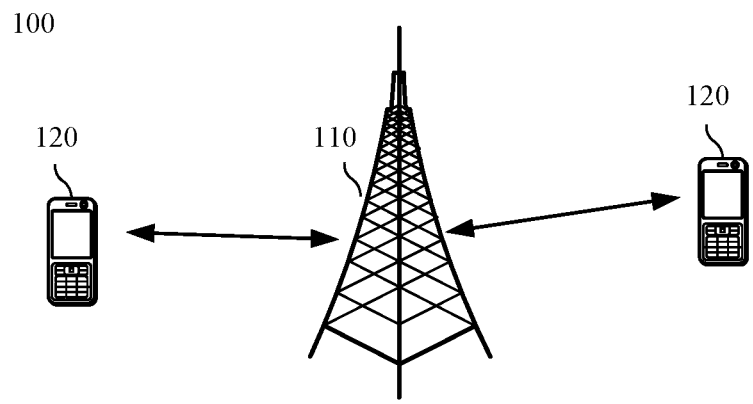
FIG. 1 is a wireless communications system 100 to which an embodiment of this application is applied.

FIG. 1 is a wireless communications system 100 to which an embodiment in accordance with the disclosure is applied. The wireless communications system 100 may include a network device 110. The network device 110 may be a device communicating with a terminal device 120. The network device 110 may provide communication coverage for a specific geographical area, and may communicate with a terminal device located in the coverage area.

For example, FIG. 1 shows one network device and two terminals. In some embodiments, the wireless communications system 100 may include a plurality of network devices, and another quantity of terminals may be included in coverage of each network device. This is not limited in this embodiment of this application.

In some embodiments, the wireless communications system 100 may further include another network entity such as a network controller and a mobility management entity. This is not limited in the various embodiments.

It should be understood that the technical solutions of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution-advanced (LTE-A) system, a universal mobile telecommunication system (UMTS), a new radio (NR), and 5G.

It should be further understood that, in various embodiments, the terminal may include but not limited to a device in the internet of things—for example, a device (which may be referred to as an "NB-IoT terminal") that accesses an NB-IoT such as: a smart meter reading device, a logistics tracking device, an environment monitoring device, or the like. The terminal may further include but is not limited to a mobile station (MS), a mobile terminal, a mobile telephone, user equipment (UE), a mobile phone (handset), and a portable device (portable equipment). The terminal device may communicate with one or more core networks via a radio access network (RAN). For example, the terminal device may be a mobile phone (or referred to as a "cellular" phone), a computer having a wireless communication function, or the like. Alternatively, the terminal device may be portable, pocket-sized, handheld, a computer built-in, or a vehicle-mounted mobile apparatus.

In various embodiments, the network device may be an access network device, for example, may be a base station, a transmission reception point (Transmit and Receive Point, TRP), or an access point. The base station may be a base station (Base Transceiver Station, BTS) in GSM or CDMA, may be a base station (NodeB) in WCDMA, may be an evolved NodeB (eNB or e-NodeB) in LTE, or may be a base station (gNB) in NR or 5G. This is not specifically limited in the various embodiments.

With development of technologies, a communications system needs to be applied to scenarios such as remote industrial control and intelligent transportation. In such scenarios, service data usually requires a relatively short transmission delay and a relatively low transmission error rate. For services having the transmission characteristic in such scenarios, such services may be classified into a guaranteed bit rate (GBR) service and a delay emergency service (Delay Critical GBR), and new QoS characteristics: a PDB and an MDBV, are introduced for such services.

PDB: The PDB indicates an upper limit of a transmission delay of a packet on a communication link. Generally, for a specific delay critical GBR service, a packet whose transmission delay exceeds the PDB may be considered lost.

MDBV: The MDBV indicates a maximum service data volume of a service that needs to be served by an access network (Radio Access Network, RAN) device in a time window of the PDB. The time window of the PDB may be a time window used in an access network part. The MDBV may be used for downlink data transmission and/or uplink data transmission.

Service data: The service data may be a packet obtained by a MAC entity of the terminal device from an upper layer, or a packet transmitted by using an air interface, for example, may be data of the GBR service, or data of the delay critical GBR service.

During service setup, service data of each service is associated with a 5G QoS identifier (5QI), which is also referred to as a "QoS scalar" and is used to indicate standardized 5G QoS characteristics, such as a default priority, the PDB, a packet error rate, a default MDBV, and a default averaging window (AW). In Table 1, one example correspondence between a service type, 5G QoS characteristics, and a 5QI is listed. For the GBR/delay critical GBR service, a core network device enables QoS file of GBR/delay critical GBR service data to carry a PDB and an MDBV of the service, and notifies the access network device of the PDB and the MDBV of the service, so that the access network device provides a communication service for the GBR/delay critical GBR service based on the PDB and the MDBV of the GBR/delay critical GBR service.

only used by the access network device to perform access control, and the foregoing new QoS characteristics are not considered in a conventional PLC process. The following briefly describes the conventional LCP process.

The MAC entity may implement MAC multiplexing based on a token bucket algorithm. A basic idea of the algorithm is to determine, based on whether there is a token in a token bucket and a quantity of tokens in the token bucket, a resource that is in a MAC PDU and that is occupied by service data of a logical channel.

Bucket size duration (BSD) in the token bucket algorithm determines a "depth" of the token bucket. The BSD and the PBR jointly determine a maximum capacity PBR×BSD of the token bucket. The maximum capacity of the token bucket limits a total volume of data that may be suspended (pending) on each logical channel, in other words, a total volume of data buffered in a buffer of each logical channel.

The terminal device may perform the LCP process according to the following steps, to allocate a resource of the MAC PDU to data buffered on each logical channel. For ease of subsequent description, resources of the MAC PDU that are allocated in step 1 may be referred to as "resources that are of the MAC PDU and that are allocated in the first round", and a remaining resource that is of the MAC PDU and that is allocated in step 3 may be referred to as "a resource that is of the MAC PDU and that is allocated in the second round".

Step 1: For all logical channels whose Bj>0, allocate, in descending order of priorities, the resource of the MAC PDU to service data buffered on each logical channel, to meet a requirement on a PBR of each logical channel.

It should be noted that, if a PBR of a logical channel is configured to infinity, a logical channel that has a lower priority is considered only after a resource of the MAC PDU

TABLE 1

| 5QI | Service type | Default priority | PDB | Packet error rate | Default MDBV | Default AW | Service example |
| --- | --- | --- | --- | --- | --- | --- | --- |
| 10 | Delay critical | 11 | 5 ms | $10^{-5}$ | 160 B | To be determined | Remote control |
| 11 | GBR | 12 | 10 ms | $10^{-5}$ | 320 B | To be determined | Intelligent traffic system |
| 12 | | 13 | 20 ms | $10^{-5}$ | 640 B | To be determined | |
| 16 | | 18 | 10 ms | $10^{-4}$ | 255 B | To be determined | Distributed automatic control |
| 17 | | 19 | 10 ms | $10^{-4}$ | 1358 B NOTE 3 | To be determined | Distributed automatic control |
| 1 | GBR | 20 | 100 ms | $10^{-2}$ | N/A | To be determined | Conversational voice |
| 2 | | 40 | 150 ms | $10^{-3}$ | N/A | To be determined | Conversational video (live streaming) |
| 3 | | 30 | 50 ms | $10^{-3}$ | N/A | To be determined | Real-time game, internet of things information, and a power distribution system |

The access network device may perform admission control on the service data of the GBR/delay critical GBR service based on the MDBV and the PDB. Specifically, the access network device evaluates, based on the MDBV and the PDB, an instantaneous rate that needs to be provided for the GBR/delay critical GBR service. For example, if the MDBV of the GBR/delay critical GBR service is 25 KB (Byte) and the PDB of the GBR/delay critical GBR service is 5 ms, the RAN needs to provide an instantaneous rate of only 500 KB/s for the service data of the GBR/delay critical GBR service, and a transmission requirement of the service data of the GBR/delay critical GBR service can be met. In this way, the access network device with the limited capacity can further accommodate service data of another service.

It can be learned from the foregoing description that, although the PDB and the MDBV are currently introduced as the new QoS characteristics, the PDB and the MDBV are is allocated, in the MAC PDU, to service data buffered in the logical channel whose PBR is configured to infinity.

Bj is a variable maintained by the terminal device for each logical channel j, and the variable indicates a quantity of currently available tokens that are in a token bucket corresponding to the logical channel. Each token indicates that 1-byte (byte) service data can be sent in the MAC PDU. In other words, a token may be understood as permission to map data of a logical channel to a transport channel. An initial value of Bj is 0 when the logical channel is set up, Bj increases by PBR×TTI at each transmission time interval (TTI), and a value of Bj cannot exceed the maximum capacity of the bucket, that is, PBR×BSD.

For example, assuming that a PBR of a logical channel is 8 kilobytes per second (kBps), and a TTI is 1 ms, a quantity of tokens corresponding to 8 kBps×1 ms=8 bytes may be injected into the token bucket at each TTI.

Step 2: Subtract, from Bj, sizes of all MAC SDUs multiplexed into the MAC PDU on a logical channel j in step 1. Specifically, for the logical channel j, each time one RLC SDU is transmitted, whether Bj is greater than 0 is first compared. If Bj is greater than 0, the SDU is added to the MAC PDU. Then, a size $T_{sdu}$ of the SDU is subtracted from Bj, and whether a requirement on a PBR is met is determined. This is repeated until Bj is less than 0 or the requirement on the PBR of the logical channel j is met. Then, a next logical channel is processed.

Step 3: If there is a remaining resource in the MAC PDU after step 1 and step 2 are performed, allocate the remaining resource in descending order of priorities of logical channels.

It should be noted that, when the terminal device allocates the MAC PDU to the data buffered on the logical channels, the following principle may be further followed: (1) If the remaining resource can be filled in with an entire RLC SDU, the RLC SDU should not be segmented. (2) If segmenting an RLC SDU that is on the logical channel, the terminal device needs to fill in one remaining resource with a maximum segment as much as possible based on a size of the remaining resource. (3) The terminal device should maximize data transmission. (4) If a radio bearer is suspended, data of a logical channel corresponding to the radio bearer should not be transmitted.

Figure 2:
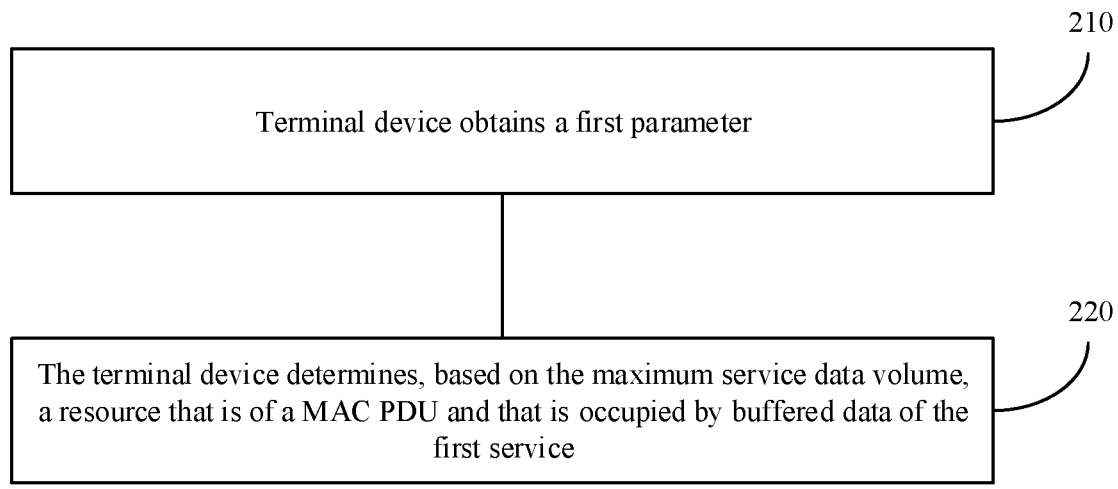
FIG. 2 is a schematic flowchart of a resource allocation method according to an embodiment of this application.

In the conventional PLC process, the new QoS characteristic MDBV is not considered. Therefore, to further improve reasonableness of the PLC process, various embodiments provide a resource allocation method. FIG. 2 is a schematic flowchart of a resource allocation method according to an embodiment of this application. The method shown in FIG. 2 includes step 210 and step 220.

210. A terminal device obtains a first parameter, where the first parameter is used to indicate a maximum service data volume that needs to be provided by an access network device for a first service in a first time length.

The first parameter may be the foregoing MDBV, or may be a QoS characteristic that has a same function or meaning in a future communications system. When the first parameter is the MDBV, the first time length may be a PDB.

To reduce a quantity of parameters obtained by the terminal device, an existing parameter may be reused for the first time length. For example, the first time length may be a BSD. Alternatively, the first time length may be a time length agreed on in a communications protocol. This is not limited in this embodiment of this application.

In some embodiments, the first parameter may be carried in logical channel configuration information, or may be indicated by a network device. In other words, the network device may send the first parameter to the terminal device. The first parameter may be carried in a radio resource control (RRC) message, for example, an RRC reconfiguration message used for configuring an air interface resource, a protocol stack configuration, and the like, an RRC release message used for releasing an air interface RRC connection, an RRC connection setup message used for setting up an air interface RRC connection, or an RRC connection resume message used for resuming an air interface RRC connection. The first parameter may also be carried in a MAC control element (CE). A sending manner of the first parameter is not limited in this embodiment.

It should be noted that, that the first parameter is used to indicate the maximum service data volume may be implemented as that the first parameter is the maximum service data volume, or may be implemented as that the first parameter indicates the maximum service data volume based on indication information (such as an index) about the maximum service data volume. This is not specifically limited in this embodiment of this application.

220. The terminal device determines, based on the maximum service data volume, a resource that is of a MAC PDU and that is occupied by buffered data of the first service.

Resources of the MAC PDU may be equivalent to a capacity of the MAC PDU.

The resource that is of the MAC PDU and that is occupied by the buffered data of the first service includes that the resource that is of the MAC PDU and that is occupied by the buffered data of the first service is 0. In other words, the terminal device determines, based on the first parameter, that the buffered data of the first service does not occupy the resource of the MAC PDU.

The resource that is of the MAC PDU and that is occupied by the buffered data of the first service further includes that the resource that is of the MAC PDU and that is occupied by the buffered data of the first service is not 0. In other words, the terminal device determines, based on the first parameter, that the buffered data of the first service occupies the resource of the MAC PDU.

In some embodiments, in a process of allocating the resources of the MAC PDU, the resources of the MAC PDU are usually allocated on a per-logical-channel basis. In other words, the buffered data of the first service may be data that is of the first service and that is buffered on a logical channel.

It should be noted that, that the terminal device determines, based on the maximum service data volume, the resource that is of the MAC PDU and that is occupied by the buffered data of the first service may include that in a process in which the terminal device allocates the resource of the MAC PDU to the data of the first service, a data volume of the data that is of the first service and that is carried in the MAC PDU cannot exceed the foregoing maximum service data volume. In some embodiments, the terminal device may determine, based on the maximum service data volume and a priority of the logical channel on which the data of the first service is transmitted, the resource that is of the MAC PDU and that is occupied by the data of the first service. In some embodiments, the terminal device may determine, based on the maximum service data volume and a PBR of the logical channel on which the data of the first service is transmitted, the resource that is of the MAC PDU and that is occupied by the data of the first service.

A current communications protocol specifies an MDBV of service data. However, in an actual service data transmission process, a service burst volume of the service data may exceed a limit of the MDBV. The following uses transmission of service data of a game service as an example for description. A 5QI value of the game service is 3, and the game service is a GBR service. The service data mainly includes service data of two types: first-type service data is service data that is of a background image and that is transmitted in a game starting phase, and second-type service data is service data that is of a moving object and a control command and that is transmitted in a game playing phase. According to Table 1, QoS characteristics of the service data of the game service are: 5QI=3, PDB=50 ms, GBR=100 kbits/s, MDBV=25 kbits, and AW=3 s.

However, in an actual transmission process of the service data of the service, requirements for transmitting the service data of the service in different time periods are not totally the same.

(1) Game starting phase: In the game starting phase, the service data used for background image uploading is mainly transmitted. In the phase, a data volume of the service data is 300 kbits, exceeding the MDBV of the service. A rate in the AW is 300 kbits/3 s=100 kbits/s, meeting a requirement on the GBR of the game service. To meet a requirement on the PDB of the game service, the access network device needs to transmit the service data of the data volume in the PDB. In other words, the access network device needs to provide an instantaneous rate up to 300 kbits/50 ms=6 M bits/s. However, in the game starting phase, the service data used for background image uploading is delay-tolerant.

(2) Game playing phase: In the game playing phase, the service data used for the moving object and the control command is mainly transmitted. In the phase, a data volume of actually transmitted service data is usually small and does not exceed the MDBV. The service data transmitted in the phase has a high requirement on a delay. The access network device needs to meet the requirement on the PDB of the game service, and needs to provide an instantaneous rate of 25 kbits/50 ms=500 kbits/s for the service data.

Therefore, to allocate the resources of the MAC PDU more reasonably, the resources of the MAC PDU may be allocated with reference to a characteristic that service data of a same type in different phases requires different QoS.

For example, the foregoing method may further include: obtaining, by the terminal device, a second parameter, where the second parameter is used to indicate the first time length; and determining, by the terminal device, a total volume of the data that is of the first service and that is transmitted in the first time length; and step 220 further includes: determining, by the terminal device based on the maximum service data volume, and the total volume of the data of the first service, the resource that is of the MAC PDU and that is occupied by the data of the first service.

The total volume of the data that is of the first service and that is transmitted in the first time length may be a total volume of data that is of the first service and that is actually transmitted by the terminal device in the first time length.

The total volume of the data that is of the first service and that is transmitted by the terminal device in the first time length may be a data volume of data that is of the first service and that has been transmitted by the terminal device in the first time length, or may be a data volume of data that is of the first service and that has been successfully transmitted by the terminal device in the first time length, or may be a sum of a data volume of data that is of the first service and that has been transmitted by the terminal device and a data volume of data that is of the first service and that is to be transmitted by the terminal device, or may be a sum of a data volume of data that is of the first service and that has been successfully transmitted by the terminal device and a data volume of data that is of the first service and that is to be transmitted by the terminal device. This is not specifically limited in this embodiment of this application.

The determining, by the terminal device based on the maximum service data volume, and the total volume of the data of the first service, the resource that is of the MAC PDU and that is occupied by the data of the first service may include: determining, by the terminal device based on a difference between the maximum service data volume, and the total volume of the data of the first service, the resource that is of the MAC PDU and that is occupied by the data of the first service; may further include: determining, by the terminal device based on a ratio of the maximum service data volume to the total volume of the data of the first service, the resource that is of the MAC PDU and that is occupied by the data of the first service; and may further include: determining, by the terminal device based on a value relationship between the maximum service data volume, and the total volume of the data of the first service, the resource that is of the MAC PDU and that is occupied by the data of the first service. This is not specifically limited in this embodiment of this application.

The determining, by the terminal device, a total volume of the data that is of the first service and that is transmitted in the first time length may be determined by the terminal device by collecting statistics about the total volume of the data that is of the first service and that is transmitted in a time window. The time window may be determined based on an end moment of the time window and a time length of the time window; to be specific, the end moment of the time window is used as a start point, and a time period of the first time length is selected as the time window along a time axis and in a direction of decreasing time.

For example, the end moment of the time window may be a current moment, or the end moment of the time window may be a start moment at which the terminal device starts to encapsulate the MAC PDU, or the end moment of the time window may be a moment at which the terminal device receives the MAC (Service Data Unit, SDU), or the end moment of the time window may be a moment at which the logical channel is set up. This is not limited in this application.

In some embodiments, the time window may be continuous in time. For instance, when a time window ends, a new time window may be opened again, and an end moment of the current time window may be used as a start moment of the next time window. In addition, the time window may alternatively be independently determined by the terminal device, and no standardization description is provided.

In some embodiments, after each round of LCP ends, the terminal device may collect, by using a MAC entity, statistics about a data volume of the data that is of the first service and that is sent on the logical channel.

In one example implementation that the logical channel configuration information carries the first parameter and the second parameter, the logical channel configuration information carries the MDBV and the PDB in an enumeration manner below.

```
          LogicalChannelConfig logical channel configuration ::=
              SEQUENCE sequence {
                  ul-SpecificParameters uplink specific parameters        SEQUENCE
sequence{
                      priority  priority        INTEGER integer (1..16),
                      prioritisedBitRate minimum bit rate        ENUMERATED
              enumerated {kBps0, kBps8, kBps16, kBps32, kBps64, kBps128, kBps256, kBps512,
                                  kBps1024, kBps2048,
              kBps4096, kBps8192, kBps16384, kBps32768, kBps65536, infinity},
                      bucketSizeDuration token bucket size duration
                  ENUMERATED enumerated {ms50, ms100, ms150, ms300, ms500, ms1000,
spare2, spare1},
                      maximumDataBurstVolume maximum data burst volume
```

```
ENUMERATED enumerated {160B, 255B, 320B, 640B, 1358B}
        packetDelayBudget packet delay budget
ENUMERATED enumerated {5ms, 10ms, 20ms}
        }
    }
```

In this embodiment, a manner of determining, by the terminal device based on the maximum service data volume, and the total volume of the data of the first service, the resource that is of the MAC PDU and that is occupied by the data of the first service is provided and described below.

In a first example implementation, the terminal device may directly determine, based on a comparison result of the maximum service data volume, and the total volume of the data of the first service, the resource that is of the MAC PDU and that is occupied by the data of the first service. Specifically, there may be the following specific implementation designs.

Example implementation 1: The terminal device determines, based on the comparison result of the maximum service data volume, and the total volume of the data of the first service, whether the data of the first service occupies entire resources of the MAC PDU. In terms of execution time, a step in which the terminal device determines the comparison result of the maximum service data volume, and the total volume of the data of the first service may be performed before a conventional LCP process.

On the one hand, if the total volume of the data of the first service is less than the maximum service data volume, or the total volume of the data of the first service is equal to the maximum service data volume, the terminal device determines that the data of the first service occupies the resource of the MAC PDU. Alternatively, at least a part of the data of the first service is encapsulated in the MAC PDU.

It should be noted that a resource amount of resources that are of the MAC PDU and that are occupied by the data of the first service may be determined based on the conventional LCP process described above, or may be determined based only on the priority of the logical channel, or may be determined based only on the PBR of the logical channel. This is not limited in this embodiment of this application.

On the other, if the total volume of the data of the first service is greater than the maximum service data volume, the terminal device determines that the data of the first service does not occupy the resource of the MAC PDU. In other words, an amount of resources allocated by the terminal device to the data of the first service in the resources of the MAC PDU is 0.

It should be noted that the foregoing merely lists a case in which when the total volume of the data of the first service is equal to the maximum service data volume, the terminal device determines that the data of the first service occupies the resource of the MAC PDU. Alternatively, the foregoing specific implementation 1 may be changed. When the total volume of the data of the first service is equal to the maximum service data volume, the terminal device may alternatively determine that the data of the first service does not occupy the resource of the MAC PDU.

A resource allocation manner described in the foregoing specific implementation 1 is simple, and reasonableness of the resource allocation manner can be improved. To further improve reasonableness of resource allocation, this embodiment of this application provides the following specific implementation 2. In the second specific implementation, an allocation process of a remaining resource (namely, a second round) in a conventional LCP process is improved.

Example implementation 2: The terminal device determines, based on the comparison result of the maximum service data volume, and the total volume of the data of the first service, whether to adjust the priority of the logical channel, and determines, based on the priority of the logical channel, whether the data of the first service occupies a remaining resource of the MAC PDU, in other words, determines whether the data of the first service occupies a resource that is of the MAC PDU and that is allocated in the second round. The remaining resource may be a remaining resource that is in the MAC PDU after the resources of the MAC PDU are allocated based on the minimum data rate PBR and the priority of the logical channel.

On the one hand, if the total volume of the data of the first service is less than the maximum service data volume, or the total volume of the data of the first service is equal to the maximum service data volume, the terminal device determines that the data of the first service occupies the remaining resource of the MAC PDU; in other words, the terminal device allocates the resource to the data of the first service from the remaining resource of the MAC PDU.

It should be noted that, in this embodiment, resources that are of the MAC PDU and that are allocated in the first round may be allocated in a resource allocation manner in the conventional LCP process, or allocated based only on the priority of the logical channel, or allocated based on the PBR of the logical channel.

It should be further understood that a resource amount of the remaining resource that is of the MAC PDU and that is occupied by the data of the first service may be determined based on the conventional LCP process described above, or may be determined based only on the priority of the logical channel, or may be determined based only on the PBR of the logical channel. This is not limited in this embodiment of this application.

On the other, if the total volume of the data of the first service is greater than the maximum service data volume, the terminal device determines that the data of the first service does not occupy the remaining resource. In other words, an amount of resources allocated by the terminal device to the data of the first service in the remaining resource of the MAC PDU is 0.

It should be noted that the foregoing merely lists a case in which when the total volume of the data of the first service is equal to the maximum service data volume, the terminal device determines that the data of the first service occupies the resource of the MAC PDU. Alternatively, the foregoing specific implementation 2 may be changed. When the total volume of the data of the first service is equal to the maximum service data volume, the terminal device determines that the data of the first service does not occupy the remaining resource of the MAC PDU.

In some embodiments, after allocation of the resources of the MAC PDU in the foregoing specific implementation 1 and specific implementation 2 is completed, the terminal device may further re-determine a comparison result of the maximum service data volume, and a total volume of the data of the first service, and determine, based on the comparison result, whether the data of the first service occupies the remaining resource of the MAC PDU. For a specific determining manner, refer to the foregoing description manner. For brevity, details are not described herein.

It should be understood that the foregoing re-determined comparison result may be different from the comparison result determined in the specific implementation 1 or the specific implementation 2. This is because statistics on the total volume that is of the data of the first service and that is in the foregoing re-determined comparison result is collected based on a re-determined time window, where the re-determined time window may be: a time window after a time window in which statistics on the total volume of the data of the first service is collected in the specific implementation 1 or the specific implementation 2.

In a second example implementation, the terminal device may determine, based on a comparison result of the maximum service data volume, and the total volume of the data of the first service, whether to adjust, from a first priority to a second priority, the priority of the logical channel on which the data of the first service is transmitted, and determine, based on the second priority, the resource that is of the MAC PDU and that is occupied by the data of the first service. Specifically, there may be the following specific implementation designs.

It should be noted that the second priority may be indicated by the network device to the terminal device. For instance, the network device sends priority information to the terminal device, where the priority information is used to indicate the second priority. Alternatively, the second priority may be independently determined by the terminal device. For example, the terminal device reduces a decrement to the first priority based on the pre-stored priority decrement, to obtain the second priority. Alternatively, the terminal device may directly reduce the priority of the logical channel to the lowest priority; that is, the second priority is the lowest priority. A manner of adjusting the priority is not specifically limited in this embodiment of this application.

The priority information such as the second priority, the decrement, or the lowest priority, may be further carried in a logical channel configuration information element, and obtained by the terminal device. One example implementation for carrying the priority information is shown below, where the priority information is represented by using a priority (priority 2).

Example implementation 3: The terminal device determines, based on the comparison result of the maximum service data volume, and the total volume of the data of the first service, whether to adjust the priority of the logical channel, and determines, based on the priority of the logical channel, whether the data of the first service occupies the resource of the entire MAC PDU. In terms of execution time, the foregoing determining process may be performed before a conventional LCP process.

On the one hand, if the total volume of the data of the first service is less than the maximum service data volume, or the total volume of the data of the first service is equal to the maximum service data volume, the terminal device determines, based on the current priority of the logical channel, the resource that is of the MAC PDU and that is occupied by the data of the first service; that is, the terminal device does not adjust the priority of the logical channel.

It should be noted that a resource amount of resources that are of the MAC PDU and that are occupied by the data of the first service may be determined based on the conventional LCP process described above, or the resource that is of the MAC PDU and that is occupied by the data of the first service may be determined based only on the priority of the logical channel. This is not limited in this embodiment of this application.

On the other hand, if the total volume of the data of the first service is greater than the maximum service data volume, the terminal device adjusts the priority of the logical channel from the first priority to the second priority, where the second priority is lower than the first priority, and the terminal device determines, based on the second priority, the resource that is of the MAC PDU and that is occupied by the data of the first service.

It should be noted that, the foregoing merely lists a case in which when the total volume of the data of the first service is equal to the maximum service data volume, the terminal device determines, based on the current priority of the logical channel, the resource that is of the MAC PDU and that is occupied by the data of the first service. Alternatively, the foregoing specific implementation 1 may be changed. When the total volume of the data of the first service is equal to the maximum service data volume, the terminal device determines, based on the second priority, the resource that is of the MAC PDU and that is occupied by the data of the first service.

```
    LogicalChannelConfig logical channel configuration ::=
    SEQUENCE sequence {
        ul-SpecificParameters uplink specific parameters       SEQUENCE sequence{
            priority priority       INTEGER integer (1..16),
            prioritisedBitRate guaranteed bit rate
    ENUMERATED enumerated {kBps0, kBps8, kBps16, kBps32, kBps64, kBps128, kBps256, kBps512,
                                        kBps1024, kBps2048,
kBps4096, kBps8192, kBps16384, kBps32768, kBps65536, infinity},
            bucketSizeDuration token bucket size duration
    ENUMERATED enumerated {ms50, ms100, ms150, ms300, ms500, ms1000, spare2, spare1},
            maximumDataBurstVolume maximum data burst volume
ENUMERATED enumerated {160B, 255B, 320B, 640B, 1358B}
            packetDelayBudget packet delay budget
ENUMERATED enumerated {5ms, 10ms, 20ms}
            priority2 priority      INTEGER integer (1..16),
        }
        ...
    }
```

Example implementation 4: The terminal device directly determines, based on the comparison result of the maximum service data volume, and the total volume of the data of the first service, whether the data of the first service occupies a remaining resource of the MAC PDU, in other words, determines whether the data of the first service occupies a resource that is of the MAC PDU and that is allocated in the second round. The remaining resource may be a remaining resource that is in the MAC PDU after the resources of the MAC PDU are allocated based on the minimum data rate PBR and the priority of the logical channel.

On the one hand, if the total volume of the data of the first service is less than the maximum service data volume, or the total volume of the data of the first service is equal to the maximum service data volume, the terminal device determines, based on the current priority of the logical channel, the remaining resource that is of the MAC PDU and that is occupied by the data of the first service; that is, the terminal device does not adjust the priority of the logical channel.

It should be noted that, in this solution, resources that are of the MAC PDU and that are allocated in the first round may be allocated in a resource allocation manner in a conventional LCP process, or allocated based only on the priority of the logical channel, or allocated based on the PBR of the logical channel.

It should be further understood that a resource amount of the remaining resource that is of the MAC PDU and that is occupied by the data of the first service may be determined based on the conventional LCP process described above, or may be determined based only on the priority of the logical channel. This is not limited in this embodiment of this application.

On the other hand, if the total volume of the data of the first service is greater than the maximum service data volume, the terminal device adjusts the priority of the logical channel from the first priority to the second priority, where the second priority is lower than the first priority, and the terminal device determines, based on the second priority, the remaining resource that is of the MAC PDU and that is occupied by the data of the first service. To be specific, an amount of resources allocated by the terminal device to the data of the first service in a remaining resource of the MAC PDU is 0.

For an example manner in which the terminal device determines, based on the second priority, the resource amount of the remaining resource that is of the MAC PDU and that is occupied by the data of the first service, refer to a conventional LCP process in which the terminal device determines, based on the priority of the logical channel, the resource that is of the MAC PDU and that is occupied by the data of the first service.

It should be noted that the foregoing merely lists a case in which the terminal device determines, based on the current priority of the logical channel when the total volume of the data of the first service is equal to the maximum service data volume, the remaining resource that is of the MAC PDU and that is occupied by the data of the first service. Alternatively, the foregoing specific implementation 4 may be changed. When the total volume of the data of the first service is equal to the maximum service data volume, the terminal device determines, based on the second priority, that the data of the first service occupies the remaining resource of the MAC PDU.

In some embodiments, after allocation of the resources of the MAC PDU in the foregoing specific implementation 3 and specific implementation 4 is completed, the terminal device may further re-determine a comparison result of the maximum service data volume, and a total volume of the data of the first service, and determine, based on the comparison result, whether to adjust the priority of the logical channel corresponding to the data of the first service. For a specific determining manner, refer to the foregoing description manner. For brevity, details are not described herein.

It should be understood that the foregoing re-determined comparison result may be different from the comparison result determined in the specific implementation 3 and that determined in the specific implementation 4. This is because statistics on the total volume that is of the data of the first service and that is in the foregoing re-determined comparison result is collected based on a re-determined time window, where the re-determined time window may be: a time window after a time window in which statistics on the total volume of the data of the first service is collected in the specific implementation 3 and that in the specific implementation 4.

In a third example implementation, a new token bucket is added, an accumulation rule on a quantity of tokens in the new token bucket is set up based on the maximum service data, and the resource that is of the MAC PDU and that is occupied by the data of the first service is determined according to the accumulation rule. In other words, the terminal device determines, based on a maximum service data volume M and the quantity of tokens on the logical channel on which the data of the first service is buffered, the resource that is of the MAC PDU and that is occupied by the data of the first service, where the quantity of tokens on the logical channel increases by M×T after a first time length T. Specifically, there may be the following specific implementation designs.

Example implementation 5: The terminal device combines the accumulation rule on the quantity of tokens in the new token bucket with an accumulation rule on the quantity of tokens in a conventional LCP process, to determine the resource that is of the MAC PDU and that is occupied by the data of the first service. From a perspective of simultaneously allocating the resources of the MAC PDU to service data buffered on a plurality of logical channels, a specific resource allocation process may include the following two steps. A variable B2j is used to indicate the quantity of tokens that are in the new token bucket.

Step 1: For all logical channels whose Bj>0 and $B_2j>0$, the terminal device determines, in descending order of priorities of the logical channels, the resources that are of the MAC PDU and that are occupied by the data buffered on the logical channels.

It should be noted that, for an accumulation rule and a usage rule of the variable Bj, refer to related descriptions in the conventional LCP process. The following focuses on describing an accumulation rule and a usage rule of the variable $B_2j$.

The terminal device may maintain a variable $B_2$ for each logical channel, and a variable of a logical channel j is represented as $B_2j$. The variable indicates a quantity of currently available tokens that are in a new token bucket corresponding to the logical channel. Each token indicates that 1-byte (byte) service data can be sent in the MAC PDU. In other words, a token may be used as permission to map data of a logical channel to a transport channel. An initial value of $B_2j$ is 0 when the logical channel j is set up, and $B_2j$ increases by M×T after each first time period T.

When the first time period T is the PDB, after the first time period, assuming that the quantity of tokens in the new token bucket is not 0, it indicates that transmission time of the buffered data of the first service exceeds the PDB, and the data of the first service is discarded. Therefore, a data volume of data that is of the first service and that is transmitted in each first time period T does not exceed the maximum service data volume. Correspondingly, the capacity of the new token bucket may be set to M×T; to be specific, the capacity of the new token bucket does not need to be greater than a quantity of tokens that corresponds to the maximum service data volume.

After the first time period, there are still tokens in the new token bucket, and consequently, in a process of accumulating tokens in the new token bucket, a quantity of tokens may exceed the capacity of the new token bucket. To avoid the foregoing case, a periodicity may be set, and after the periodicity, the quantity of tokens in the new token bucket may be cleared. In some embodiments, a periodicity length of the periodicity may be the first time period. That is, $B_2j$ may be set to 0 after the first time period T.

Step 2: Subtract, from Bj, sizes of all MAC SDUs multiplexed into the MAC PDU on the logical channel j in step 1, and subtract, from $B_2j$, the sizes of all the MAC SDUs multiplexed into the MAC PDU on the logical channel j in step 1.

When a size of a to-be-sent RLC SDU is greater than $B_2j$ (that is, $B_2j$−size (RLC SDU)<0), there is no sufficient tokens in the new token bucket for sending the RLC SDU. In this case, the SDU should be placed in an RLC queue until there are sufficient tokens for transmission. However, if the SDU is buffered in the queue for an excessively long time, the queue may overflow. Consequently, subsequent SDUs are discarded.

In some embodiments, considering the foregoing case, a case in which $B_2j$<0 may be allowed. To be specific, the SDU is sent first in a "loan" manner, and the loan is "paid off" subsequently. Before the loan is paid off, no SDU is allowed to be sent.

In some embodiments, a case in which $B_2j$<0 may alternatively not be allowed. To be specific, it is not allowed to send the SDU first in a "loan" manner and "pay off" the loan subsequently.

For example, when $B_2j$>0 (there is a token in the token bucket) and $B_2j$−size of (RLC SDU)<0, service data is not put into the queue, a sufficient quantity of tokens are instead obtained in the "loan" manner, and the service data is multiplexed into the MAC PDU. Service data buffered on the logical channel can continue to participate in the resource allocation process of the MAC PDU only after the quantity of borrowed tokens are returned, that is, until $B_2j$>0.

Example implementation 6: The terminal device maintains only a $B_2j$ variable that indicates the quantity of tokens that are in the new token bucket. An accumulation rule and a usage rule of the variable $B_2j$ are the same as those described in the specific implementation 5. For brevity, details are not described herein again.

It should be noted that, in the solution described in the third possible implementation, the terminal device determines the resource that is of the MAC PDU and that is occupied by the data of the first service, where the resource of the MAC PDU may be the resources that are of the MAC PDU and that are allocated in the first round in the foregoing description. In other words, the solution described in the third possible implementation may improve step 1 and step 2 in a conventional LCP process. The resource of the MAC PDU may be all resources of the MAC PDU.

It should be noted that the specific implementations described in the foregoing three possible implementations may be combined with each other. For example, the terminal device may allocate, according to the specific implementation described in the third possible implementation, the resources that are of the MAC PDU and that are in the first round, and allocates, according to the specific implementation 4 in the second possible implementation, the resource that is of the MAC PDU and that is in the second round, namely, the remaining resource of the MAC PDU. For another example, the terminal device may allocate, according to the specific implementation described in the third possible implementation, the resources that are of the MAC PDU and that are in the first round, and allocates, according to the specific implementation 2 in the first possible implementation, the resource that is of the MAC PDU and that is in the second round, namely, the remaining resource of the MAC PDU.

To simplify a process in which a terminal device allocates resources of a MAC PDU, an embodiment of this application further provides a resource allocation manner. The terminal device directly determines, based on resource allocation indication information, whether data that is of a first service and that is transmitted on a logical channel participates in a process of allocating a remaining resource of the MAC PDU.

For example, the terminal device obtains the resource allocation indication information, where the resource allocation indication information is used to indicate whether the data of the first service participates in the process of allocating the remaining resource of the MAC PDU, and allocates the remaining resource of the MAC PDU based on the resource allocation indication information.

The resource allocation indication information may be indicated by a network device to the terminal device; in other words, the network device sends the resource allocation indication information to the terminal device. Alternatively, the resource allocation indication information may be carried in a logical channel configuration information element, and is obtained by the terminal device. The following shows one example implementation of carrying the resource allocation indication information (indication). That the resource allocation indication information is true (true) may indicate that the data that is of the first service and that is buffered on a logical channel configured based on logical channel configuration information does not participate in the process of allocating the remaining resource of the MAC PDU. That the resource allocation indication information is false may indicate that the data that is of the first service and that is buffered on the logical channel configured based on the logical channel configuration information participates in the process of allocating the remaining resource of the MAC PDU. Alternatively, that the resource allocation indication information is true (true) may indicate that data that is of the first service and that is buffered on a logical channel configured based on logical channel configuration information participates in the process of allocating the remaining resource of the MAC PDU. That the resource allocation indication information is false (false) may indicate that the data that is of the first service and that is buffered on the logical channel configured based on the logical channel configuration information does not participate in the process of allocating the remaining resource of the MAC PDU.

```
    LogicalChannelConfig logical channel configuration ::=
    SEQUENCE sequence {
        ul-SpecificParameters uplink specific parameters        SEQUENCE
sequence{
            priority priority       INTEGER integer (1..16),
            prioritisedBitRate guaranteed bit rate
    ENUMERATED enumerated {kBps0, kBps8, kBps16, kBps32, kBps64, kBps128,
kBps256, kBps512,
                        kBps1024, kBps2048,
kBps4096, kBps8192, kBps16384, kBps32768, kBps65536, infinity},
            bucketSizeDuration token bucket size duration
    ENUMERATED enumerated {ms50, ms1000, ms150, ms300, ms500, ms1000,
spare2, spare1},
            indication                                   indication
ENUMERATED enumerated {true true, false false}
            ...
    }
```

It is mentioned above that even for a same service, a QoS characteristic of service data is not totally the same in different time periods. Therefore, an embodiment of this application provides a resource allocation manner based on the characteristic that the QoS characteristic of the service data changes with time. A plurality of LCP parameter sets are configured for a same service flow. A terminal device may determine, in different time periods based on different LCP parameter sets, a resource that is of a MAC PDU and that is occupied by the service data.

For instance, the terminal device selects a target LCP parameter set from the plurality of LCP parameter sets, and determines, based on the target LCP parameter set, a resource that is of the MAC PDU and that is occupied by data of a first service.

In one example implementation, that the terminal device determines, based on the target LCP parameter set, a resource that is of the MAC PDU and that is occupied by data of a first service includes: that the terminal device determines, in a first time period based on the target LCP parameter set, the resource that is of the MAC PDU and that is occupied by the data of the first service.

In some embodiments, the first time period may be any time period in a process of transmitting the data of the first service. The first time period may be configured by a network device for the terminal device, or may be directly specified in a communications protocol. This is not limited in this embodiment of this application.

In one example implementation, the method further includes: obtaining, by the terminal device, time information, where the time information is used to indicate a time period in which each of the plurality of LCP parameter sets is used.

In one example implementation, each of the plurality of LCP parameter sets includes at least one of the following parameters: a priority of a logical channel on which the data of the first service is buffered, a PBR of the logical channel, and a BSD of a token bucket of the logical channel.

In one example implementation, the plurality of LCP parameter sets and/or the time information may be carried in a logical channel configuration information element, and obtained by the terminal device. One example implementation of carrying the plurality of LCP parameter sets is shown below.

```
        LogicalChannelConfig logical channel configuration ::=
        SEQUENCE sequence {
            ul-SpecificParameters1 uplink specific parameters            SEQUENCE
sequence {
                priority1 priority      INTEGER integer (1..16),
                prioritisedBitRate2 guaranteed bit rate
        ENUMERATED enumerated {kBps0, kBps8, kBps16, kBps32, kBps64, kBps128,
kBps256, kBps512,
                            kBps1024, kBps2048,
kBps4096, kBps8192, kBps16384, kBps32768, kBps65536, infinity},
                bucketSizeDuration3 token bucket size duration
        ENUMERATED enumerated {ms50, ms100, ms150, ms300, ms500, ms1000,
spare2, spare1},
                }
                ul-SpecificParameters2 uplink specific parameters            SEQUENCE
sequence {
                priority2 priority      INTEGER integer (1..16),
                prioritisedBitRate2 guaranteed bit rate
        ENUMERATED enumerated {kBps0, kBps8, kBps16, kBps32, kBps64, kBps128,
kBps256, kBps512,
                            kBps1024, kBps2048,
kBps4096, kBps8192, kBps16384, kBps32768, kBps65536, infinity},
                bucketSizeDuration2 token bucket size duration
        ENUMERATED enumerated {ms50, ms100, ms150, ms300, ms500, ms1000,
spare2, spare1},
                }
                Duration duration                                      ENUMERATED
enumerated {50ms, 1s, 5s, 10s, 20s}
            }
                ...
            }
```

The plurality of LCP parameter sets and/or the time information may alternatively be indicated by the network device to the terminal device. In one example implementation, only the time information is indicated by the network device to the terminal device. The time information may be carried in an RRC message such as an RRC reconfiguration message, an RRC release message, an RRC connection setup message, or an RRC connection resume message. The time information may alternatively be carried in MAC layer signaling such as a MAC CE. The time information may alternatively be carried in physical layer signaling.

In one example implementation, the method further includes: receiving, by the terminal device, indication information about the LCP parameter sets sent by the network device, where the indication information about the LCP parameter sets is used to indicate that the terminal device determines, in the first time period based on the target LCP parameter set, the resource that is of the MAC PDU and that is occupied by the data of the first service; in other words, the indication information of the LCP parameter sets is used to indicate that the terminal device uses the target LCP parameter set and time, namely, the first time period, for using the target LCP parameter set.

Figure 3:
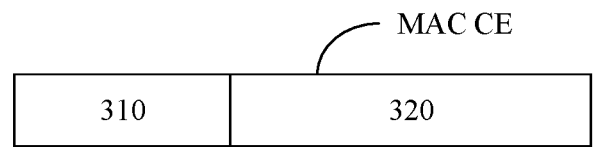
FIG. 3 is a schematic block diagram of a MAC CE according to an embodiment of this application.

In one example implementation, the indication information of the LCP parameter sets may be alternatively carried in a MAC CE. FIG. 3 is a schematic block diagram of a MAC CE according to an embodiment of this application; The MAC CE shown in FIG. 3 includes a first field 310 and a second field 320. The first field is used to indicate a time length of the first time period, and the second field is used to indicate an index of the target LCP parameter set.

In one example implementation, the method further includes: receiving, by the terminal device, first indication information sent by the network device, where the first indication information is used to indicate that an LCP parameter set of a logical channel on which the first service is transmitted is the target LCP parameter set; in other words, the first indication information carries an index of the logical channel and an index of the LCP parameter set.

Figure 4:
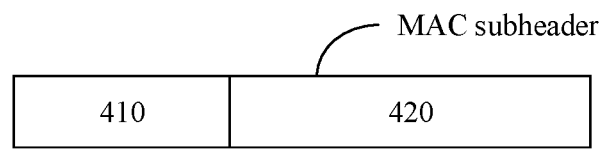
FIG. 4 is a schematic block diagram of a MAC subheader according to an embodiment of this application.

In some embodiments, the first indication information is carried in a MAC subheader of a MAC CE. FIG. 4 is a schematic block diagram of a MAC subheader according to an embodiment of this application. The MAC subheader includes a first field 410 and a second field 420. The first field carries the index of the LCP parameter set. For example, when the first field DD=00, it indicates that the target LCP parameter set is selected as the LCP parameter set of the logical channel. The second field of the MAC subheader indicates the logical channel identifier (Logical Channel Identity, LCID) of the logical channel on which the data of the first service is transmitted.

It should be noted that a manner of determining a time period in which the target LCP parameter set is used by the terminal device as the LCP parameter set of the logical channel on which the data of the first service is transmitted may include the following several manners: Starting from a moment at which the terminal device receives the first indication information, the terminal device may use the target LCP parameter set as the LCP parameter set of the logical channel on which the data of the first service is transmitted. Alternatively, starting from a moment at which the terminal device receives the first indication information, the terminal device may use, after a preset time period, the target LCP parameter set as the LCP parameter set of the logical channel on which the data of the first service is transmitted. Alternatively, after receiving the first indication information, the terminal device may use, in a preset time period, the target LCP parameter set as the LCP parameter set of the logical channel on which the data of the first service is transmitted.

The preset time period may be configured by the network device for the terminal device, or may be specified in a protocol. This is not limited in this embodiment of this application.

In one example implementation, the plurality of LCP parameter sets and/or the time information may alternatively be specified in a communications protocol. This is not limited in this embodiment of this application.

The foregoing describes in detail the resource allocation methods in the various embodiments with reference to FIG. 1 to FIG. 4. The following describes in detail apparatuses in the various embodiments with reference to FIG. 5 to FIG. 10. It should be understood that the apparatuses shown in FIG. 5 to FIG. 10 can implement the steps in FIG. 1 to FIG. 4. To avoid repetition, details are not described herein again.

Figure 5:
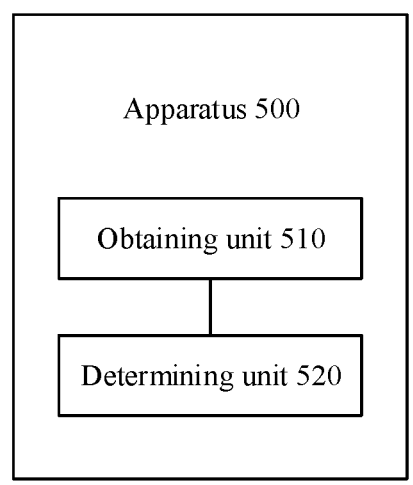
FIG. 5 is a schematic block diagram of a resource allocation apparatus according to an embodiment of this application.

FIG. 5 is a schematic block diagram of a resource allocation apparatus according to an embodiment of this application. The apparatus 500 shown in FIG. 5 includes an obtaining unit 510 and a determining unit 520.

The obtaining unit 510 is configured to obtain a first parameter, where the first parameter is used to indicate a maximum service data volume that is of a first service and that needs to be provided by an access network device in a first time length.

The determining unit 520 is configured to determine, based on the maximum service data volume obtained by the obtaining unit, a resource that is of a media access control protocol data unit MAC PDU and that is occupied by buffered data of the first service.

In one example implementation, the obtaining unit is further configured to obtain a second parameter, where the second parameter is used to indicate the first time length.

The determining unit is further configured to: determine a total volume of the data that is of the first service and that is transmitted in the first time length; and determine, based on the maximum service data volume, and the total volume of the data of the first service, the resource that is of the MAC PDU and that is occupied by the data of the first service.

In one example implementation, the determining unit is further configured to: if the total volume of the data of the first service is less than or equal to the maximum service data volume, determine that the data of the first service occupies the resource of the MAC PDU.

In one example implementation, the determining unit is further configured to: if the total volume of the data of the first service is greater than the maximum service data volume, determine that the data of the first service does not occupy the resource of the MAC PDU.

In one example implementation, the determining unit is further configured to: if the total volume of the data of the first service is less than or equal to the maximum service data volume, determine that the data of the first service occupies a remaining resource of the MAC PDU, where the remaining resource is a remaining resource that is in the MAC PDU after resources of the MAC PDU are allocated based on a minimum data rate PBR and a priority of logical channels.

In one example implementation, the determining unit is further configured to: if the total volume of the data of the first service is greater than the maximum service data volume, determine that the data of the first service does not occupy the remaining resource.

In one example implementation, the determining unit is further configured to: determine, based on the maximum service data volume, and the total volume of the data of the first service, a priority of a logical channel on which the data of the first service is buffered; and determine, based on the priority of the logical channel, the resource that is of the MAC PDU and that is occupied by the data of the first service.

In one example implementation, the determining unit is further configured to: if the total volume of the data of the first service is greater than the maximum service data volume, adjust the priority of the logical channel from a first priority to a second priority, where the second priority is lower than the first priority.

In one example implementation, the determining unit is further configured to determine, based on the second priority, the resource that is of the MAC PDU and that is occupied by the data of the first service.

In one example implementation, the determining unit is further configured to determine, based on a maximum service data volume M and a quantity of tokens on a logical channel on which the data of the first service is buffered, the resource that is of the MAC PDU and that is occupied by the data of the first service, where the quantity of tokens on the logical channel increases by M×T after the first time length.

Figure 6:
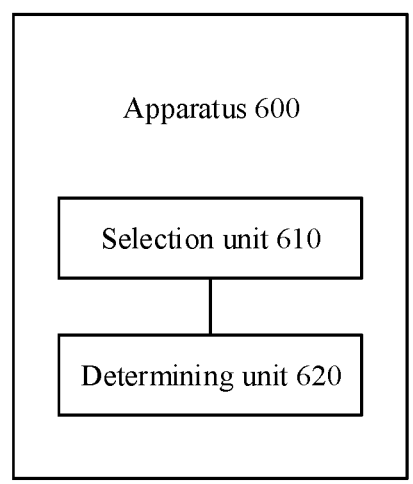
FIG. 6 is a schematic block diagram of a resource allocation apparatus according to an embodiment of this application.

FIG. 6 is a schematic block diagram of a resource allocation apparatus according to an embodiment of this application. An apparatus 600 shown in FIG. 6 includes a selection unit 610 and a determining unit 620.

The selection unit 610 is configured to select a target LCP parameter set from a plurality of LCP parameter sets.

The determining unit 620 is configured to determine, based on the target LCP parameter set, a resource that is of a MAC PDU and that is occupied by data of a first service.

In one example implementation, the determining unit is further configured to determine, in a first time period based on the target LCP parameter set, the resource that is of the MAC PDU and that is occupied by the data of the first service.

In one example implementation, the determining unit is further configured to determine, by the terminal device in a first time period based on the target LCP parameter, the resource that is of the MAC PDU and that is occupied by the data of the first service.

In one example implementation, the apparatus further includes an obtaining unit, configured to obtain time information, where the time information is used to indicate a time period in which each of the plurality of LCP parameter sets is used.

In one example implementation, each LCP parameter of the plurality of LCP parameter sets includes at least one of the following parameters: a priority of a logical channel on which the data of the first service is buffered, a PBR of the logical channel, and a BSD of a token bucket of the logical channel.

Figure 7:
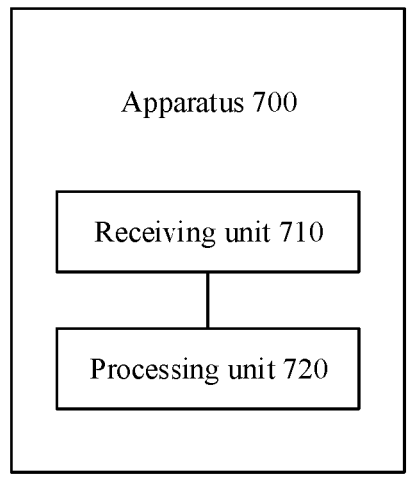
FIG. 7 is a schematic block diagram of a resource allocation apparatus according to an embodiment of this application.

FIG. 7 is a schematic block diagram of a resource allocation apparatus according to an embodiment of this application. An apparatus 700 shown in FIG. 7 includes a receiving unit 710 and a processing unit 720.

The receiving unit 710 is configured to receive resource allocation indication information sent by a network device, where the resource allocation indication information is used to indicate whether data of the first service participates in a process of allocating a remaining resource of a MAC PDU, where the remaining resource is a remaining resource that is in the MAC PDU after resources of the MAC PDU are allocated based on a minimum data rate PBR and a priority of logical channels.

The processing unit 720 is configured to allocate the remaining resource of the MAC PDU based on the resource allocation indication information.

In an optional embodiment, the selection unit 610 and the determining unit 620 may be a processor 820, and the terminal device may further include a transceiver 840, an input/output interface 830, and a memory 810. Details are shown in FIG. 8.

In an optional embodiment, the obtaining unit 510 and the determining unit 520 may be a processor 820, and the terminal device may further include a transceiver 840, an input/output interface 830, and a memory 810. Details are shown in FIG. 8.

In an optional embodiment, the processing unit 720 may be a processor 820, the receiving unit 710 may be a transceiver 840, and the terminal device may further include an input/output interface 830 and a memory 810. Details are shown in FIG. 8.

Figure 8:
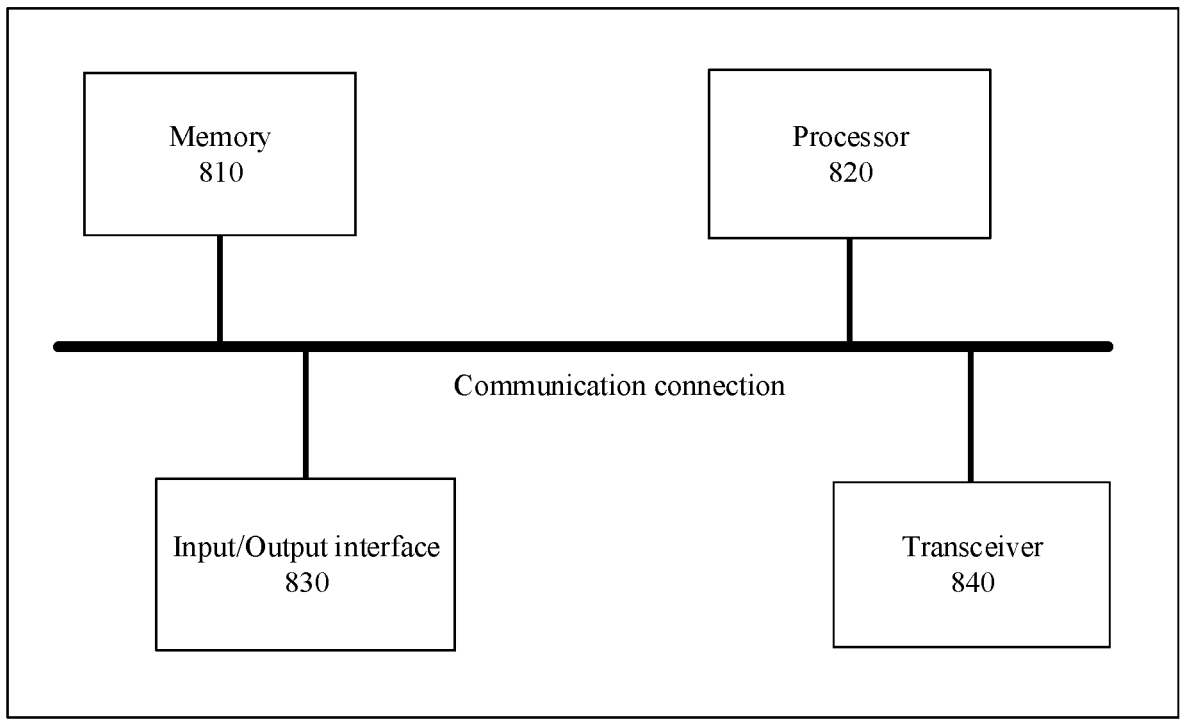
FIG. 8 is a schematic block diagram of a terminal according to another embodiment of this application.

FIG. 8 is a schematic block diagram of a terminal according to another embodiment of this application. A terminal 800 shown in FIG. 8 may include a memory 810, a processor 820, an input/output interface 830, and a transceiver 840. The memory 810, the processor 820, the input/output interface 830, and the transceiver 840 are connected through an internal connection path. The memory 810 is configured to store an instruction. The processor 820 is configured to execute the instruction stored in the memory 820, to control the input/output interface 830 to receive input data and information, or output data such as an operation result, and control the transceiver 840 to send a signal.

It should be understood that, in this embodiment of this application, the processor 820 may be a general-purpose central processing unit (Central Processing Unit, CPU), a microprocessor, an application-specific integrated circuit (Application Specific Integrated Circuit, ASIC), or one or more integrated circuits, and is configured to execute a related program, to implement the technical solutions provided in the various embodiments.

It should be further understood that the transceiver 840 is also referred to as a communications interface, and a transceiver apparatus such as but not limited to a transceiver is used to implement communication between the terminal 800 and another device or a communications network.

The memory 810 may include a read-only memory and a random access memory, and provide an instruction and data to the processor 820. A part of the processor 820 may further include a non-volatile random access memory. For example, the processor 820 may further store information of a device type.

In an implementation process, steps in the foregoing methods can be implemented by using a hardware integrated logical circuit in the processor 820, or by using instructions in a form of software. The methods disclosed with reference to the various embodiments may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory 810, and the processor 820 reads information in the memory 810 and completes the steps in the foregoing methods in combination with hardware of the processor 820. To avoid repetition, details are not described herein again.

It should be understood that, the processor in the various embodiments may be a central processing unit (CPU), or may alternatively be another general purpose processor, a digital signal processor (DSP), an application-specific integrated circuit (ASIC), a field programmable gate array (FPGA) or another programmable logical device, a discrete gate or transistor logical device, a discrete hardware component, or the like. The general purpose processor may be a microprocessor, or the processor may be any conventional processor or the like.

Figures 9, 10:
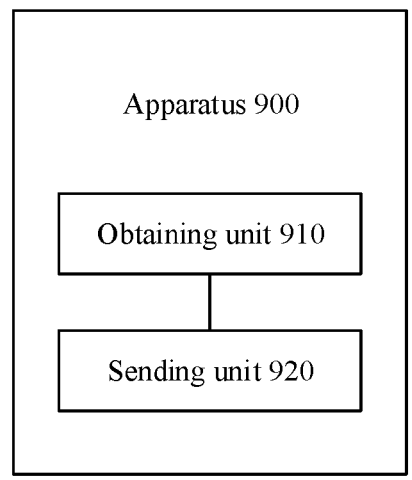
FIG. 9 is a schematic block diagram of a resource allocation apparatus according to an embodiment of this application.
FIG. 10 is a schematic block diagram of a network device according to another embodiment of this application.

FIG. 9 is a schematic block diagram of a resource allocation apparatus according to an embodiment of this application. The apparatus shown in FIG. 9 includes an obtaining unit 910 and a sending unit 920.

The obtaining unit 910 is configured to obtain a first parameter, where the first parameter is used to indicate a maximum service data volume that needs to be provided by an access network device for a first service in a first time length.

The sending unit 920 is configured to send the first parameter to the terminal device.

In one example implementation, the apparatus further includes:

a sending unit, configured to send a second parameter to the terminal device, where the second parameter is used to indicate a time length of the unit time.

In an optional embodiment, the obtaining unit 910 may be a processor 1020, the sending unit 920 may be a transceiver 1040, and the network device may further include an input/output interface 1030 and a memory 1010. Details are shown in FIG. 10.

FIG. 10 is a schematic block diagram of a network device according to another embodiment of this application. A network device 1000 shown in FIG. 10 may include a memory 1010, a processor 1020, an input/output interface 1030, and a transceiver 1040. The memory 1010, the processor 1020, the input/output interface 1030, and the transceiver 1040 are connected through an internal connection path. The memory 1010 is configured to store an instruction. The processor 1020 is configured to execute the instruction stored in the memory 1020, to control the input/output interface 1030 to receive input data and information, or output data such as an operation result, and control the transceiver 1040 to send a signal.

The processor 1020 is configured to obtain a first parameter, where the first parameter is used to indicate a maximum service data volume that needs to be provided by an access network device for a first service in a first time length.

The transceiver 1040 is configured to send the first parameter to the terminal device.

It should be understood that, in this embodiment of this application, the processor 1020 may be a general-purpose central processing unit (CPU), a microprocessor, an application-specific integrated circuit (ASIC), or one or more integrated circuits, and is configured to execute a related program, to implement the technical solutions provided in the various embodiments.

It should be further understood that the transceiver 1040 is also referred to as a communications interface, and a transceiver apparatus such as but not limited to a transceiver is used to implement communication between the network device 1000 and another device or a communications network.

The memory 1010 may include a read-only memory and a random access memory, and provide an instruction and data to the processor 1020. A part of the processor 1020 may further include a non-volatile random access memory. For example, the processor 1020 may further store information of a device type.

In an implementation process, steps in the foregoing methods can be implemented by using a hardware integrated logical circuit in the processor 1020, or by using instructions in a form of software. The methods disclosed with reference to the various embodiments may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically erasable programmable memory, or a register. The storage medium is located in the memory 1010, and the processor 1020 reads information in the memory 1010 and completes the steps in the foregoing methods in combination with hardware of the processor 1020. To avoid repetition, details are not described herein again.

It should be understood that, the processor in the various embodiments may be a central processing unit (CPU), or may alternatively be another general purpose processor, a digital signal processor (DSP), an application-specific integrated circuit (ASIC), a field programmable gate array (FPGA) or another programmable logical device, a discrete gate or transistor logical device, a discrete hardware component, or the like. The general purpose processor may be a microprocessor, or the processor may be any conventional processor or the like.

It should be understood that in the various embodiments, "B corresponding to A" indicates that B is associated with A, and that B may be determined based on A. However, it should further be understood that determining B based on A does not mean that B is determined based only on A. B may alternatively be determined based on A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the various embodiments. The execution sequences of the processes should be determined based on functions and internal logic of the processes, and should not constitute any limitation on implementation processes of the various embodiments.

In the embodiments provided in this application, it should be understood that the disclosed system, apparatus, and methods may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, function units in the various embodiments may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the various embodiments are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), an optical medium (for example, a digital versatile disc (Digital Video Disc, DVD)), a semiconductor medium (for example, a solid-state drive (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource occupation determining method, comprising:
   obtaining, by a terminal device, a first parameter, wherein the first parameter indicates a maximum service data volume to be provided by an access network device for a first service in a first time length;
   obtaining, by the terminal device, a second parameter, wherein the second parameter indicates the first time length;
   determining, by the terminal device, a total volume of the data of the first service transmitted in the first time length; and
   determining, by the terminal device based on the maximum service data volume, a resource that is a capacity of a media access control protocol data unit MAC PDU, wherein buffered data of the first service can occupy the capacity of the MAC PDU, including determining, by the terminal device based on the maximum service data volume and the total volume of the data of the first service, the resource that is of the MAC PDU and that is occupied by the data of the first service.

2. The method according to claim 1, wherein determining, by the terminal device based on the maximum service data volume, and the total volume of the data of the first service, the resource that is of the MAC PDU comprises:
   when the total volume of the data of the first service is less than or equal to the maximum service data volume, determining, by the terminal device, that the data of the first service occupies the resource of the MAC PDU.

3. The method according to claim 1, wherein the determining, by the terminal device based on the maximum service data volume, and the total volume of the data of the first service, the resource that is of the MAC PDU comprises:
   when the total volume of the data of the first service is greater than the maximum service data volume, determining, by the terminal device, that the data of the first service does not occupy the resource of the MAC PDU.

4. The method according to claim 1, wherein determining, by the terminal device based on the maximum service data volume, and the total volume of the data of the first service, the resource that is of the MAC PDU and that is occupied by the data of the first service comprises:
   when the total volume of the data of the first service is less than or equal to the maximum service data volume, determining, by the terminal device, that the data of the first service occupies a remaining resource of the MAC PDU, wherein the remaining resource is a remaining resource in the MAC PDU after resources of the MAC PDU are allocated based on a minimum data rate PBR and a priority of logical channels.

5. The method according to claim 4, wherein determining, by the terminal device based on the maximum service data volume, and the total volume of the data of the first service, the resource that is of the MAC PDU and that is occupied by the buffered data of the first service further comprises:
   when the total volume of the data of the first service is greater than the maximum service data volume, determining, by the terminal device, that the data of the first service does not occupy the remaining resource.

6. The method according to claim 1, wherein determining, by the terminal device based on the maximum service data volume, and the total volume of the data of the first service, the resource that is of the MAC PDU comprises:
   determining, by the terminal device based on the maximum service data volume, and the total volume of the data of the first service, a priority of a logical channel on which the data of the first service is buffered; and
   determining, by the terminal device based on the priority of the logical channel, the resource that is of the MAC PDU and that is occupied by the data of the first service.

7. The method according to claim 6, wherein determining, by the terminal device based on the maximum service data volume, and the total volume of the data of the first service, a priority of the logical channel comprises:
   when the total volume of the data of the first service is greater than the maximum service data volume, adjusting, by the terminal device, the priority of the logical channel from a first priority to a second priority, wherein the second priority is lower than the first priority.

8. The method according to claim 7, wherein determining, by the terminal device based on the priority of the logical channel, the resource that is of the MAC PDU comprises:
determining, by the terminal device based on the second priority, the resource that is of the MAC PDU and that is occupied by the data of the first service.

9. The method according to claim 1, wherein the determining, by the terminal device based on the maximum service data volume, the resource that is of the MAC PDU and that is occupied by data of the first service comprises:
determining, by the terminal device based on a value M of the maximum service data volume and a quantity of tokens on a logical channel on which the data of the first service is buffered, the resource that is of the MAC PDU, wherein the quantity of tokens on the logical channel increases by M×T after the first time length T.

10. The method of claim 1, further comprising:
obtaining, by a network device, the first parameter; and
sending, by the network device, the first parameter to the terminal device.

11. The method according to claim 10, wherein the method further comprises:
sending, by the network device, the second parameter to the terminal device.

12. A communications apparatus, comprising a processor, wherein the processor is configured to: be coupled to a memory, and read and execute an instruction in the memory, to perform the method according to claim 1.

13. A non-transitory computer-readable medium, wherein the non-transitory computer-readable medium stores program code configured to be run on a processor that enables the processor to perform the method according to claim 1.

14. A communications system comprising a terminal device and a network device, wherein the terminal device is configured to perform the method according to claim 1 and the network device is configured to obtain the first parameter, and send the first and second parameters to the terminal device.

15. The method of claim 1 wherein determining, by the terminal device, a total volume of the data that is of the first service and that is transmitted in the first time length comprises collecting statistics about the total volume of the data that is of the first service and that is transmitted in a time window, wherein the time window is determined based on an end moment of the time window used as a start point, and a time period of the first time length is selected as the time window along a time axis and in a direction of decreasing time.

16. A terminal device for connection to a network having an access network device thereon, the terminal device comprising at least one processor, the terminal device processor being configured to:
obtain a first parameter that indicates a maximum service data volume to be provided by the access network device for a first service in a first time length;
obtain a second parameter that indicates the first time length;
determine a total volume of the data of the first service transmitted in the first time length; and
determine, based on the maximum service data volume, a resource that is a capacity of a media access control protocol data unit MAC PDU, wherein buffered data of the first service can occupy the capacity of the MAC PDU, including determine, based on the maximum service data volume and the total volume of the data of the first service, the resource that is of the MAC PDU and that is occupied by the data of the first service.

17. The terminal device of claim 16 wherein the processor is further configured to collect statistics about the total volume of the data that is of the first service and that is transmitted in a time window, wherein the time window is determined based on an end moment of the time window used as a start point, and a time period of the first time length is selected as the time window along a time axis and in a direction of decreasing time.

18. A terminal device for connection to a network having an access network device thereon, the terminal device comprising at least one processor, wherein buffered data of a first service can occupy a capacity of a media access control protocol data unit (MAC PDU), the terminal device processor being configured to:
obtain a first parameter that indicates a maximum service data volume to be provided by the access network device for a first service in a first time length;
obtain a second parameter that indicates the first time length;
determine a total volume of data of the first service transmitted in the first time length; and
determine, based on the maximum service data volume and the total volume of the data of the first service, the capacity that is of the MAC PDU and that is occupied by the data of the first service.

19. The terminal device of claim 18 wherein the processor is further configured to collect statistics about the total volume of the data that is of the first service and that is transmitted in a time window, wherein the time window is determined based on an end moment of the time window used as a start point, and a time period of the first time length is selected as the time window along a time axis and in a direction of decreasing time.

* * * * *